United States Patent
Matsui et al.

(10) Patent No.: US 9,740,420 B2
(45) Date of Patent: Aug. 22, 2017

(54) STORAGE SYSTEM AND DATA MANAGEMENT METHOD

(71) Applicant: HITACHI, LTD., Tokyo (JP)

(72) Inventors: Yuko Matsui, Tokyo (JP); Shigeo Homma, Tokyo (JP)

(73) Assignee: HITACHI, LTD., Tokyo (JP)

(*) Notice: Subject to any disclaimer, the term of this patent is extended or adjusted under 35 U.S.C. 154(b) by 120 days.

(21) Appl. No.: 14/758,839

(22) PCT Filed: Mar. 21, 2013

(86) PCT No.: PCT/JP2013/058047
§ 371 (c)(1),
(2) Date: Jul. 1, 2015

(87) PCT Pub. No.: WO2014/147786
PCT Pub. Date: Sep. 25, 2014

(65) Prior Publication Data
US 2015/0339076 A1    Nov. 26, 2015

(51) Int. Cl.
*G06F 12/02* (2006.01)
*G06F 3/06* (2006.01)

(52) U.S. Cl.
CPC ............ *G06F 3/0629* (2013.01); *G06F 3/061* (2013.01); *G06F 3/064* (2013.01); *G06F 3/067* (2013.01); *G06F 3/0608* (2013.01); *G06F 3/0661* (2013.01); *G06F 3/0689* (2013.01)

(58) Field of Classification Search
CPC ...... G06F 3/061; G06F 3/0629; G06F 3/0608; G06F 3/064; G06F 3/0661; G06F 3/067; G06F 3/0689

USPC ......................................... 711/170, 162, 165
See application file for complete search history.

(56) References Cited

U.S. PATENT DOCUMENTS

| | | | | |
|---|---|---|---|---|
| 5,963,937 A | * | 10/1999 | Yamasaki | G06F 12/0866 |
| 2004/0205452 A1 | * | 10/2004 | Fitzsimons | G06F 17/3089 |
| | | | | 715/255 |
| 2006/0184561 A1 | * | 8/2006 | Terada | G06F 17/303 |
| 2010/0332456 A1 | * | 12/2010 | Prahlad | G06F 17/302 |
| | | | | 707/664 |
| 2011/0125809 A1 | * | 5/2011 | Woods | G06F 17/3002 |
| | | | | 707/809 |
| 2013/0054519 A1 | * | 2/2013 | Ohno | H04L 67/2823 |
| | | | | 707/610 |
| 2016/0210342 A1 | * | 7/2016 | Vallabhaneni | G06F 17/30575 |

FOREIGN PATENT DOCUMENTS

| | | |
|---|---|---|
| JP | 2008-047196 A | 2/2008 |
| JP | 2008-152422 A | 7/2008 |
| JP | 2013-050847 A | 3/2013 |

* cited by examiner

*Primary Examiner* — Pierre-Michel Bataille
(74) *Attorney, Agent, or Firm* — Volpe and Koenig, P.C.

(57) ABSTRACT

A storage system comprises a storage apparatus and a storage device that is a basis for a storage area provided to the storage apparatus. The storage device determines whether or not a first format that is a format of data stored in the storage device and a second format that is a format of data utilized by the storage apparatus managing the data match with each other, and performs format conversion of either converting data in the first format to data in the second format or converting data in the second format to data in the first format in a case where the first format and the second format do not match with each other.

13 Claims, 18 Drawing Sheets

Control memory /150

RAID group management table

| RAID Group# /151 | RAID level /152 | Device unit # /153 | RG capacity /154 | Drive number /155 | Drive capacity /156 | Conversion function presence /157 | Drive notification apparatus # /158 |
|---|---|---|---|---|---|---|---|
| 1 | RAID5 (2D+1P) | 1 | 500 GB | 0 | 250GB | Present | 1 |
| 1 | RAID5 (2D+1P) | 1 | 500 GB | 1 | 250GB | Present | 1 |
| 1 | RAID5 (2D+1P) | 1 | 500 GB | 2 | 250GB | Present | 2 |
| 2 | RAID5 (2D+1P) | 1 | 600GB | 3 | 300GB | Present | 1 |
| 2 | RAID5 (2D+1P) | 1 | 600GB | 4 | 300GB | Present | 3 |
| 2 | RAID5 (2D+1P) | 1 | 600GB | 5 | 300GB | Present | 4 |
| 2 | RAID5 (2D+1P) | 1 | 600GB | 6 | 300GB | Present | 2 |
| 3 | - | - | - | - | - | - | - |
| 4 | RAID1 (1D+1D) | 3 | 1000 GB | 0 | 1000GB | Present | 2 |
| 4 | RAID1 (1D+1D) | 3 | 1000 GB | 2 | 1000GB | Present | 2 |

Fig. 4

Format type management table

| Apparatus # | Apparatus format type |
|---|---|
| 0 | A |
| 1 | A |
| 2 | B |
| 3 | Null |
| 4 | C |

Format type table 500

| Type 510 | Block size 520 | Data guarantee code 530 |
|---|---|---|
| A | 520Byte | LA/LRC |
| B | 4104Byte | T10DIF |
| C | 4096Byte | None |
| ... | | |

Fig. 7

Logical-physical conversion table 550

| Block # 551 | FM chip # 552 | In-block page # 553 | Storage system # 554 | Logical address 555 | Page format type 556 |
|---|---|---|---|---|---|
| 00 | 1 | 000 | 0 | 0x00000000 | A |
|  |  | 001 | 2 | 0x00020100 | B |
| ... | ... | ... | ... | ... | ... |
| 10 | 2 | 100 | 0 | 0x00001000 | C |
|  |  | 101 | null | Null | Null |
| ... | ... | ... | ... | ... | ... |

Fig. 8

Format type management table

| Apparatus # ~410 | Apparatus format type ~420 |
|---|---|
| 0 | A→B |
| 1 | A |
| 2 | B |
| 3 | Null |
| 4 | C |

STORAGE SYSTEM AND DATA MANAGEMENT METHOD

TECHNICAL FIELD

The present invention relates to a data management technique in a storage system.

BACKGROUND ART

In recent years, flash memories have become lower in price, and a high-speed flash drive (e.g., solid state drives (SSD)) including flash memory is installed in storage systems as well. Since the performance of the flash drive is high in such a storage apparatus, there is a problem that a microprocessor (MP) included in a controller of the storage apparatus becomes a bottleneck and the resource of a flash device cannot be utilized sufficiently.

In this regard, a technique in which a flash drive is shared and used by a plurality of storage apparatuses has been devised. In this technique, one of the purposes is to render data movement unnecessary even in the case of migration from an existing storage apparatus to a new-generation storage apparatus.

However, this technique assumes that the physical format (block size) or the format of a data guarantee code or the like is the same for data handled by a storage apparatus before migration and a storage apparatus after migration, and cannot be applied to migration between storage apparatuses that handle different formats.

In recent years, there are cases where the format of a data guarantee code of data handled by a storage apparatus is changed in order to improve reliability. Hard disk drive (HDD) formed of 4 KB sectors (blocks) have also appeared, and it is presumed that changes or the like of a format from 512 byte to 4 KB blocks will occur in the future. Thus, there may be a possibility of migrations between storage apparatuses of different formats occurring frequently.

Meanwhile, a technique is known in which attribute information (sector size or the like) of a migration-destination storage apparatus is acquired and data is migrated to the migration-destination storage apparatus after changing the format based on the attribute information (e.g., see PTL 1).

CITATION LIST

Patent Literature

PTL 1
Japanese Patent Application Laid-open No. 2008-152422

SUMMARY OF INVENTION

Technical Problem

In the case where the data format handled by a migration-source storage apparatus and the data format handled by a migration-destination storage apparatus differ, processing is necessary in which all data managed by the migration-source storage apparatus is temporarily read from a storage device, the data is changed to a format handled by the migration-destination storage apparatus, and the changed data is written in a storage device.

Therefore, there is a problem that the migration-source storage apparatus cannot be utilized until this processing is terminated. In recent years, the data amount managed by a storage apparatus has been continuing to increase, and there is a risk of an increase in the time required for processing of data movement along with this format conversion.

Not only in cases where data is migrated between such storage apparatuses but also in cases where, for example, a storage apparatus managing data is changed to another storage apparatus in which the handled format is different, it is necessary to execute processing in which data is converted to another format. A similar problem may occur in such cases as well.

Solution to Problem

A storage system comprises a storage apparatus and a storage device that is a basis for a storage area provided to the storage apparatus. The storage device determines whether or not a first format that is a format of data stored in the storage device and a second format that is a format of data utilized by the storage apparatus managing the data match with each other, and performs format conversion of either converting data in the first format to data in the second format or converting data in the second format to data in the first format in a case where the first format and the second format do not match with each other.

A "storage apparatus" in this description may be an apparatus including a redundant-array-of-independent-disks (RAID) group formed of one or a plurality of non-volatile storage devices, or may be an apparatus not including a RAID group.

Advantageous Effects of Invention

With this invention, load of processing in a storage apparatus in the case where it is necessary to convert the format of data can be reduced, and the storage apparatus can be utilized at an early point.

BRIEF DESCRIPTION OF DRAWINGS

FIG. 4 is a configuration diagram of a RAID group management table according to Example 1.

FIG. 6 is a configuration diagram of a format type management table according to Example 1.

FIG. 7 is a configuration diagram of a format type table according to Example 1.

FIG. 8 is a configuration diagram of a logical-physical conversion table according to Example 1.

FIG. 12 is a diagram showing the state of the format type management table after storage apparatus migration according to Example 1.

DESCRIPTION OF EMBODIMENTS

Some examples will be described with reference to the drawings. The examples described below do not limit the invention set forth in the claims, and not all of various components and combinations thereof described within the examples is necessarily mandatory in the solution of the invention.

While there are cases in the description below where information in the present invention is described with an expression such as "aaa table," the information may be expressed without a data structure such as a table. Therefore, in order to show non-dependency upon a data structure, "aaa table" or the like may be referred to as "aaa information."

When describing content of each piece of information, the expression "number" is used, but is replaceable with identification information, identifier, name, title, or the like.

EXAMPLE 1

First, an overview of a storage system according to Example 1 will be described.

Figure 1:
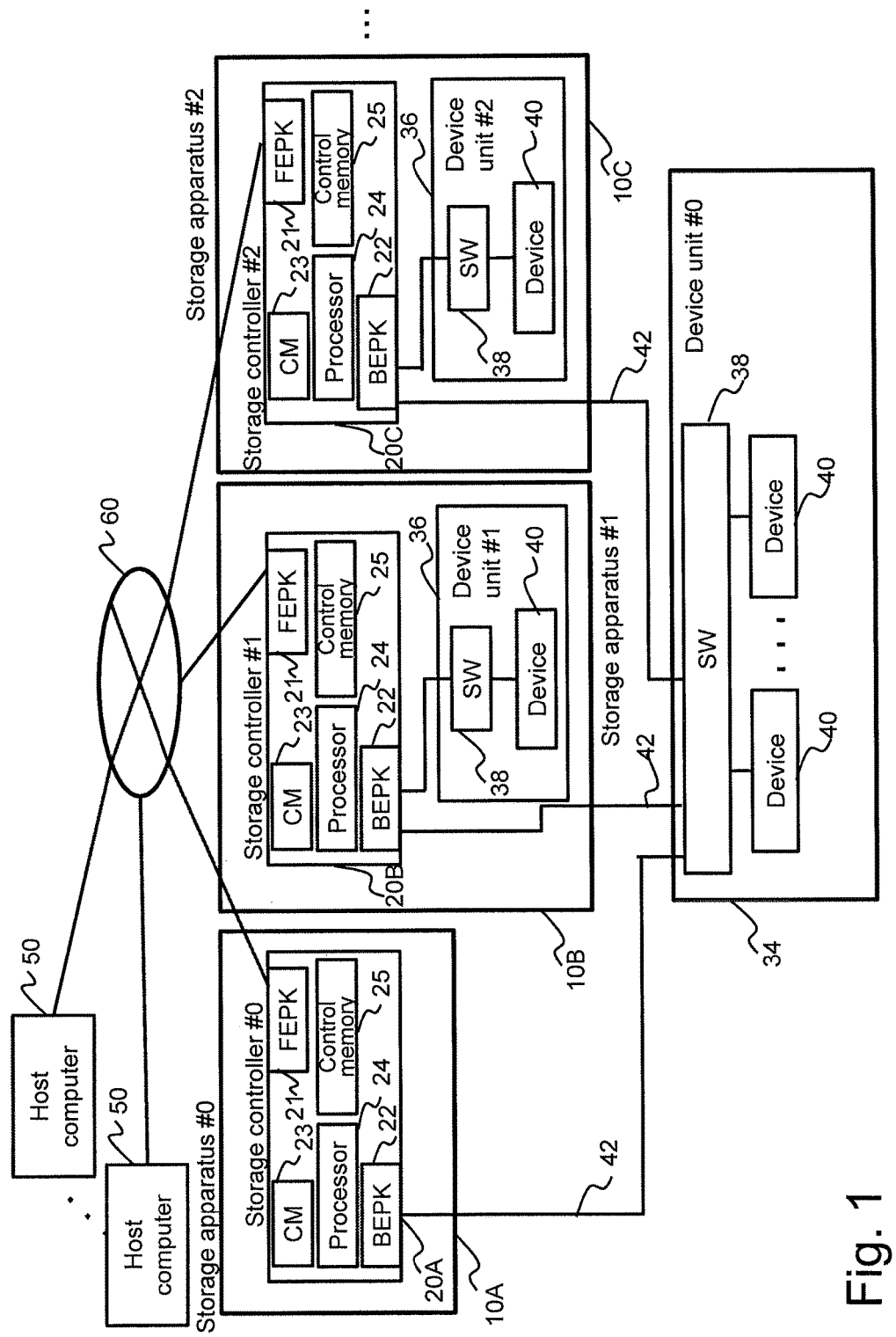
FIG. 1 is a configuration diagram of a storage system according to Example 1.

In the storage system according to Example 1, a plurality of storage apparatuses 10 share one device unit (shared device unit) 34, as shown in FIG. 1. Specifically, for example, a storage area within the one device unit 34 is divided, and a divided storage area (device allocation area) is allocated to each storage apparatus 10, so that the respective storage apparatuses 10 can share the device unit 34. For example, the device allocation area may be provided to a host computer as a logical unit (LU) that is a logical storage device (may be an online LU), or may be a storage area (e.g., offline LU) that is used by the storage apparatus 10 without being provided to a host computer 10.

In the storage system, a device (storage device) 40 included in the shared device unit 34 manages, for each predetermined area unit (e.g., for each page unit), the format type (information for identifying a first format) of data stored in the area, and manages the format type (information for identifying a second format) utilized by each storage apparatus 10.

With the device 40, the format type utilized by the storage apparatus 10 is received from the storage apparatus 10, whether or not the format type of data stored in a predetermined area of the device 40 and the format type of the storage apparatus 10 to which the area is allocated match is determined at a predetermined time point, e.g., time point when reclamation is executed, the data in the area of the device 40 is read in the case of a non-match, and the read data is converted to a format type of the storage apparatus 10 and written in the device 40.

Accordingly, the format of the device 40 can be appropriately changed to the format of the format type of the storage apparatus 10 without the storage apparatus 10 performing change processing (movement of data or the like) for a format. Thus, load of processing of the storage apparatus 10 can be reduced.

The above is an overview of the storage system according to Example 1. There may be one instead of a plurality of storage apparatuses 10.

The details of the storage system according to Example 1 will be described below.

FIG. 1 is a configuration diagram of the storage system according to Example 1.

The storage system includes one or more host computers 50 and a storage system coupled to the one or more host computers 50. The storage system includes a plurality of storage apparatuses 10 (10A, 10B, and 10C) and the shared device unit 34. The host computer 50 and the storage apparatus 10 are coupled via a network 60.

The host computer 50 performs communication with the storage apparatus 10 coupled to the network 60. The host computer 50 transmits an Input/Output (I/O) command (Read command or Write command) to the storage apparatus 10. I/O destination information that is information for identifying a storage area of an I/O destination is associated with the I/O command. The I/O destination information includes identification information (e.g., logical unit number (LUN) of LU) of the storage area of the I/O destination and information (e.g., logical block address (LEA)) for identifying an I/O destination area in the storage area of the I/O destination.

The storage apparatus 10 manages one or more storage areas realized by at least one of a storage medium of the shared device unit 34 and a storage medium of an exclusive device unit 36, and provides the one or more storage areas to the host computer 50. The storage apparatus 10 receives an I/O command from the host computer 50, and executes I/O (Read or Write) of data (user data) with respect to a storage area designated in the received I/O command.

The storage apparatus 10 includes a storage controller 20 (20A, 20B, and 20C). The storage controller 20 executes control processing of the storage apparatus 10. The storage controller 20 includes a front end package (FEPK) 21, a back end package (BEPK) 22, a cache memory (CM) 23, a processor 24, and a control memory 25. The FEPK 21, the BEPK 22, the CM 23, the processor 24, and the control memory 25 are coupled via an internal network.

The FEPK 21 is an interface for communicating with the host computer 50. The FEPK 21 is coupled to the network 60. The BEPK 22 is an interface for coupling with the shared device unit 34 or the exclusive device unit 36.

The CM 23 temporarily stores data to be written in the shared device unit 34 or the exclusive device unit 36 or data read from the shared device unit 34 or the exclusive device unit 36. The processor 24 executes various processing by executing a program stored in the control memory 25. The control memory 25 stores various programs or various information. For example, the control memory 25 stores an LU management table 110 (see FIG. 3) and a RAID group management table 150 (see FIG. 4).

For example, the storage apparatus 10 may include the exclusive device unit 36 internally as in the storage apparatus 10B and 10C or may not include the exclusive device unit 36 internally as in the storage apparatus 10A. The exclusive device unit 36 includes a switch (SW) 38 and the device 40. The switch 38 of the exclusive device unit 36 is coupled with the BEPK 22 of the storage controller 20 of the storage apparatus 10 to which the exclusive device unit 36 belongs, and only the storage controller 20 is accessible to the device 40. The device 40 may be a hard disk drive (HDD) (e.g., serial advanced technology attachment (ATA) (SATA) HDD or serial attached small computer system interface (SCSI) (SAS) HDD) or a non-volatile memory drive (e.g., flash drive such as SSD). This example is described assuming that the device 40 is a flash drive. It is assumed that a flash memory (FM) included in the flash drive is formed of a plurality of blocks, and each block is an FM (e.g., NAND FM) formed of a plurality of pages. The FM may be a type of FM in which, unless data is erased from a page, data cannot be newly written in the page. The FM may be a type of FM in which reading and writing is performed in page units and erasure is performed in block units.

The shared device unit (referred to as device unit #0 in some cases) 34 includes the SW 38 and the device (storage device) 40. The device 40 includes a storage area. The switch 38 of the shared device unit 34 is coupled to the storage controller 20 (specifically, the BEPK 22 of the storage controller 20) of the plurality of storage apparatuses 10 via a cable 42. In an example shown in FIG. 1, the switch 38 is coupled to the storage controllers 20A, 20B, and 20C via the cable 42. The cable 42 may be, for example, a SAS cable or a peripheral component interconnect express (PCIe) cable. With such a configuration, the plurality of storage apparatuses 10 can access a storage area of the device 40 of the shared device unit 34.

Figure 2:
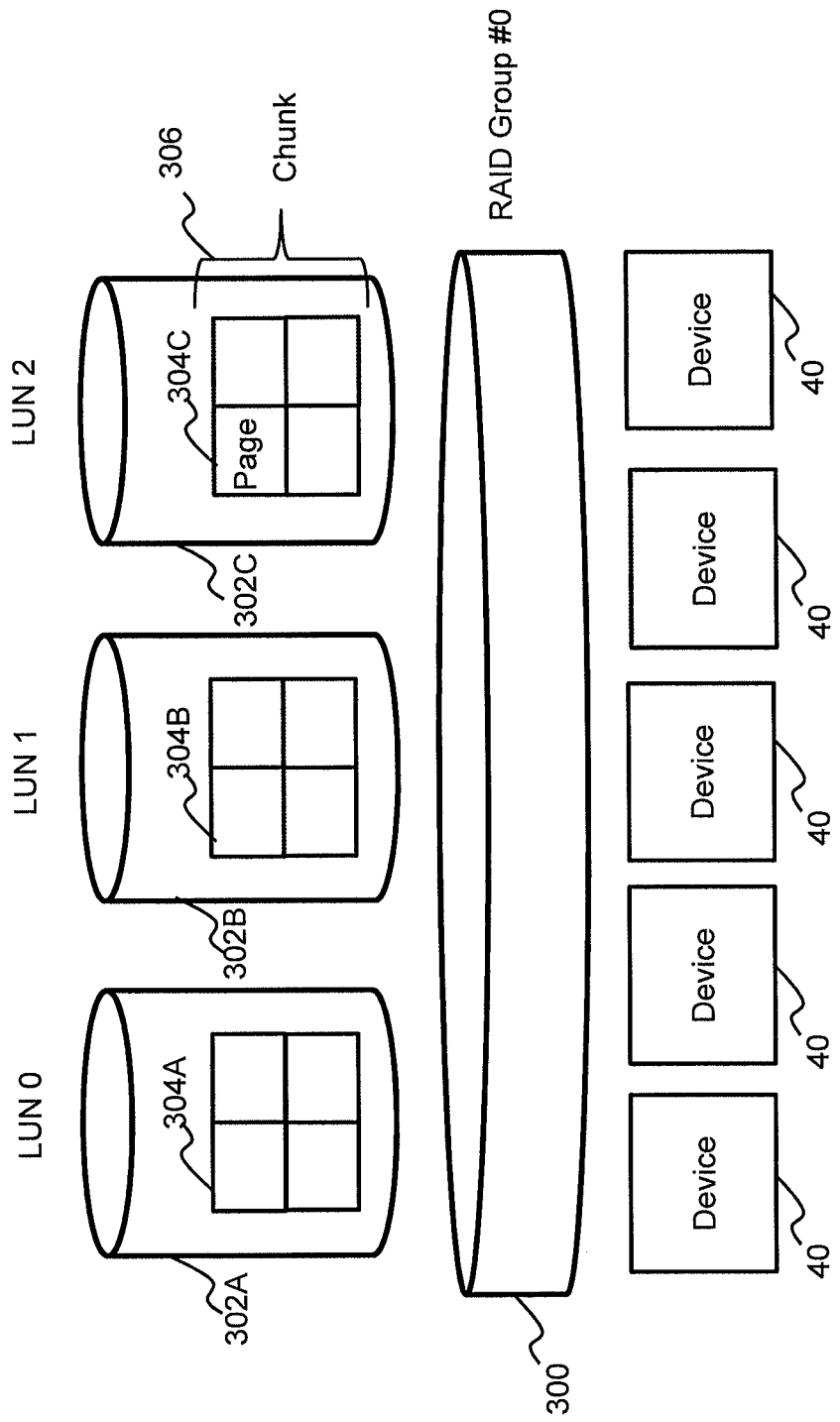
FIG. 2 is a diagram illustrating a device allocation unit according to Example 1.

FIG. 2 is a diagram illustrating a device allocation unit according to Example 1.

A RAID group 300 is formed of a storage area of a storage medium (e.g., flash memory chip (FM chip) 47) of a plurality of the devices 40. The RAID group 300 has a RAID configuration of a predetermined RAID level, in consideration of the redundancy of data as a preparation for a fault. The recording media forming the RAID group 300 need to be stored in the same device unit.

The RAID group 300 is a basis for one or more logical units (LUs) 302 (302A, 302B, and 302C in FIG. 2). The LU 302 maybe divided into and managed in units of a chunk 306 that is a predetermined data unit.

In the LU 302, the chunk 306 may be divided into and managed as a page 304 (304C) that is a smaller data unit. The data unit allocated to the storage apparatus 10 by the shared device unit 34 and the exclusive device unit 36 may be a unit by the RAID group 300, a unit by the LU 302, a unit by the chunk 306, or a unit by the page 304. Since the data allocation unit is recognized as the LU 302 by the host computer 50, it is desirable that a data allocation arrangement change in consideration of the performance load balance be implemented in allocation units smaller than the LU 302. Each storage apparatus 10 provides one or more LUs 302 to the host computer 50. The storage apparatus 10 is allocated with a storage area in units of the chunk 306 (or page 304).

Figure 3:
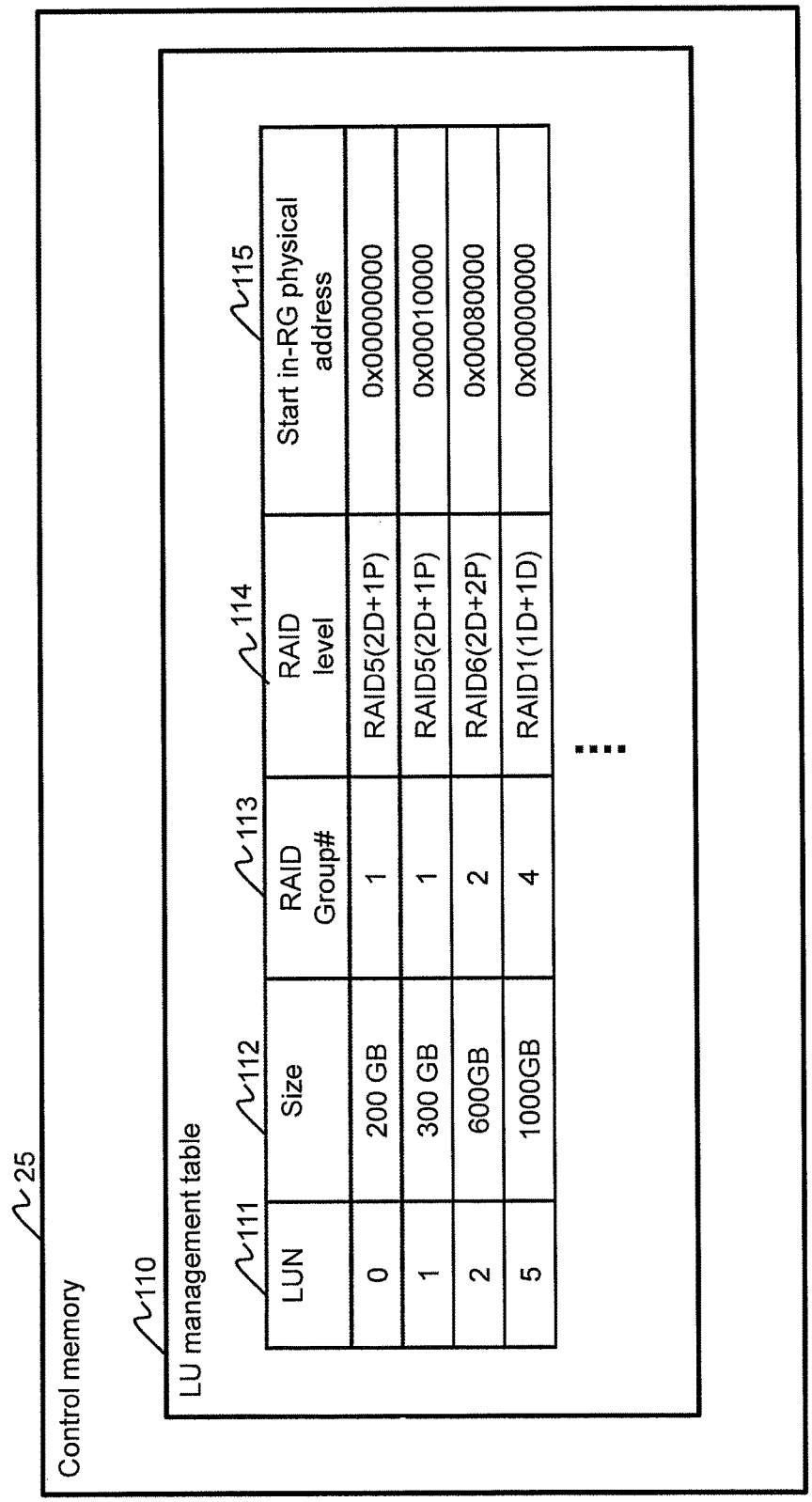
FIG. 3 is a configuration diagram of an LU management table according to Example 1.

FIG. 3 is a configuration diagram of the LU management table according to Example 1.

The LU management table 110 is a table that manages information of an LU existing in the shared device unit 34 and the exclusive device unit 36, and includes an LU number (LUN) 111, a size 112, a RAID Group number (#) 113, a RAID level 114, and a start in-RG physical address 115.

The LUN 111 is an identification number of an LU recognized by the host computer 50. The size 112 is a size of an LU corresponding to the LUN 111. The RAID Group # 113 is a number of a RAID group to which an LU corresponding to the LUN 111 belongs. The RAID level 114 is a RAID level of a RAID group of the RAID Group # 113. The start in-RG physical address 115 is an address (start in-RG physical address) showing the start within a RAID Group of a physical storage area storing data of an LU corresponding to the LUN 111.

FIG. 4 is a configuration diagram of the RAID group management table according to Example 1.

The RAID group management table 150 is a table that manages information showing what device of what device unit forms a RAID group utilized by the storage apparatus 10, and includes a RAID Group # 151, a RAID level 152, a device unit number (#) 153, an RG capacity 154, a drive number 155, a drive capacity 156, a conversion function presence 157, and a drive notification apparatus number (#) 158.

The RAID Group # 151 is a number of a RAID group. The RAID level 152 is a RAID level of a RAID group of the RAID Group # 151. The device unit # 153 is a number of a device unit storing a RAID group of the RAID Group # 151. The RG capacity 154 is a capacity of a RAID group of the RAID Group # 151. The drive number 155 is a number (drive number) of the device 40 forming a storage area of a RAID group of the RAID Group # 151. The drive capacity 156 is a capacity of a storage area provided to a RAID group of the RAID Group # 151 from the device 40 of the drive number 155. The conversion function presence 157 shows whether or not the device 40 of the drive number 155 has a function (format conversion function) of converting the format of data to another format. For example, in the case where the device 40 is a flash drive according to this example, the format conversion function is present, and therefore the conversion function presence 157 is "present." For example, if the device 40 is an existing HDD, the format conversion function is not present, and therefore the conversion function presence 157 is "absent." The drive notification apparatus # 158 is an apparatus number recognized by the device 40 of the drive number 155 as a number of the storage apparatus 10 storing the RAID group management table 150.

Figure 5:
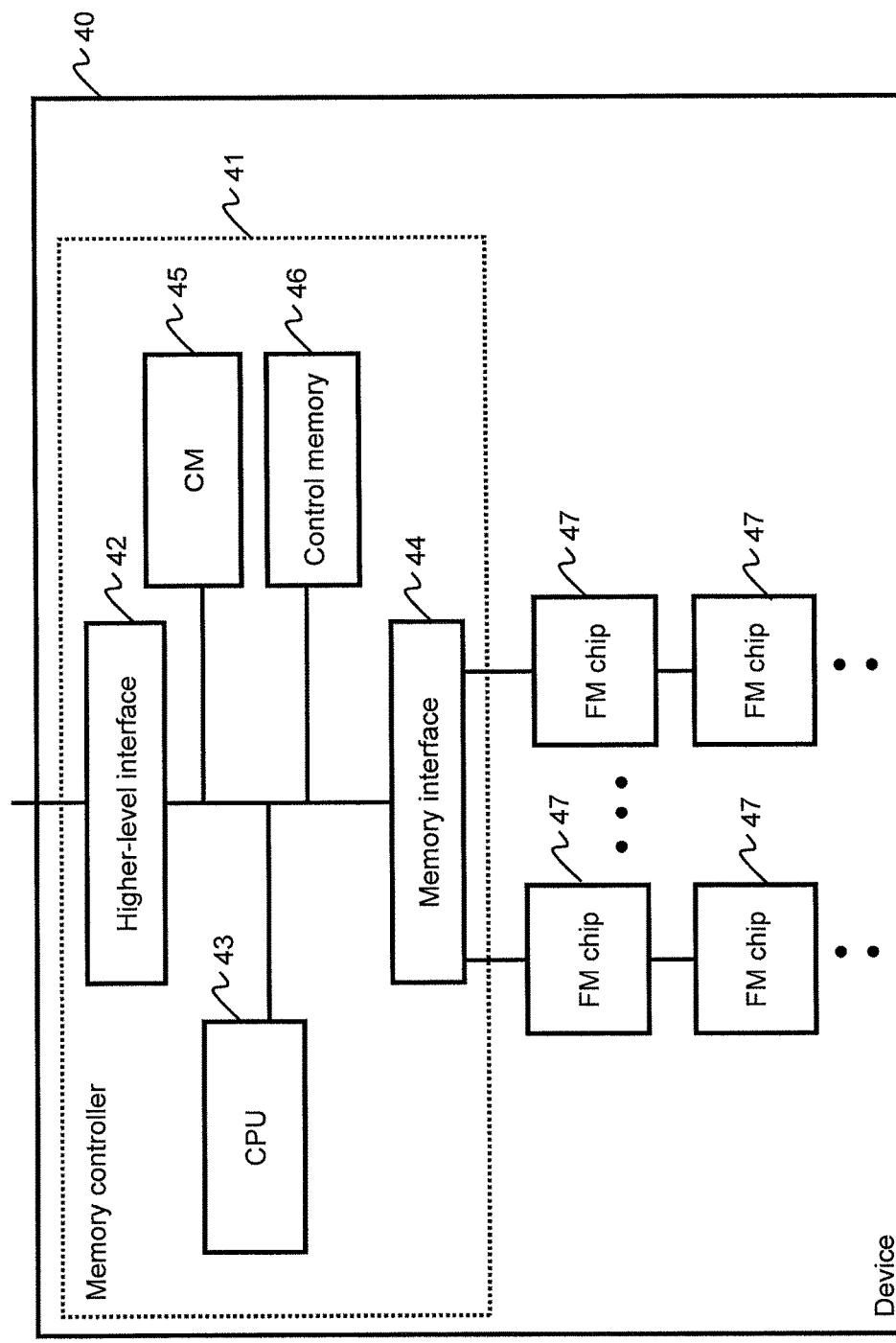
FIG. 5 is a configuration diagram of a device according to Example 1.

FIG. 5 is a configuration diagram of the device according to Example 1.

The device 40 includes a memory controller 41 and one or more FM chips 47. The memory controller 41 includes a higher-level interface 42, a CPU 43, a memory interface 44, a cache memory (CM) 45, and a control memory 46.

The higher-level interface 42 is an interface for communicating with a higher-level apparatus (e.g., storage apparatus 10). The higher-level interface 42 is coupled with the SW 38 via a cable. The memory interface 44 is an interface for communicating with the FM chip 47. The memory interface 44 is coupled with the plurality of FM chips 47 via a cable. The CM 45 temporarily stores data to be written in the FM chip 47, data read from the FM chip 47, or the like. The CPU 43 executes various processing by executing a program stored in the control memory 46. The control memory 46 stores various programs or various information. For example, the control memory 46 stores a file format type management table 400 (see FIG. 6), a file format type table 500 (see FIG. 7), and a logical-physical conversion table 550 (see FIG. 8)

FIG. 6 is a configuration diagram of the format type management table according to Example 1.

The format type management table 400 is a table that manages the format type of data utilized by each storage apparatus 10. The format type management table 400 includes an apparatus number (#) 410 and an apparatus format type 420.

The apparatus number (#) 410 is an apparatus number with which the storage apparatus 10 is identified in the device 40 storing the format type management table 400. The format type 420 is a format type used in the storage apparatus 10 shown by the apparatus # 410. The format type shows a type of the physical format (block size) of data, a data guarantee code, or the like. A block differs from a block showing an erasure unit of the FM chip 47, and is a management unit of data on the storage controller 20 side in the storage apparatus 10. In this example, the format type 420 is a format type name showing the format type, and the specific content corresponding to the format type name is managed in the format type table 500 (see FIG. 7).

FIG. 7 is a configuration diagram of the format type table according to Example 1.

The format type table 500 is a table that manages the specific content of the format type, and includes a type 510, a block size 520, and a data guarantee code 530.

The type 510 is a format type name showing a format type. The block size 520 is a size of a block in a format corresponding to a format type of the type 510. The data guarantee code 530 is information for identifying a data guarantee code used in a format corresponding to a format type of the type 510.

FIG. 8 is a configuration diagram of the logical-physical conversion table according to Example 1.

The logical-physical conversion table 550 is a table that manages mapping of a page into which a block in the device 40 (flash storage in this example) is divided and a logical address in the storage apparatus 10. The logical-physical conversion table 550 includes a block # 551, an FM chip #552, an in-block page # 553, an apparatus # 554, a logical address 555, and a page format type 556.

The block # 551 is a block number with which a block is identified. The FM chip # 552 is a number (FM chip number) of the FM chip 47 storing a block of the block # 551. The in-block page # 553 is a number of a page in a block of the block # 551. The apparatus # 554 is an apparatus number of the storage apparatus 10 managing data of a page corresponding to the in-block page # 553. The logical address 555 is a logical address corresponding to data of a page corresponding to the in-block page # 553. The page format type 556 is a format type (page format type) of data stored in a page corresponding to the in-block page # 553.

Next, a processing operation in the storage system according to Example 1 will be described.

First, start-up processing (initial configuration processing) executed after power activation has been performed for the storage apparatus 10 will be described. The power activation may be performed for one of or a plurality of the storage apparatuses 10. At this time, similar initial configuration processing is started in each storage apparatus 10. The shared device unit 34 may be electrically conducted before the power activation of the storage apparatus 10, or power may be activated together at the time of the power activation of the storage apparatus 10.

Figure 9:
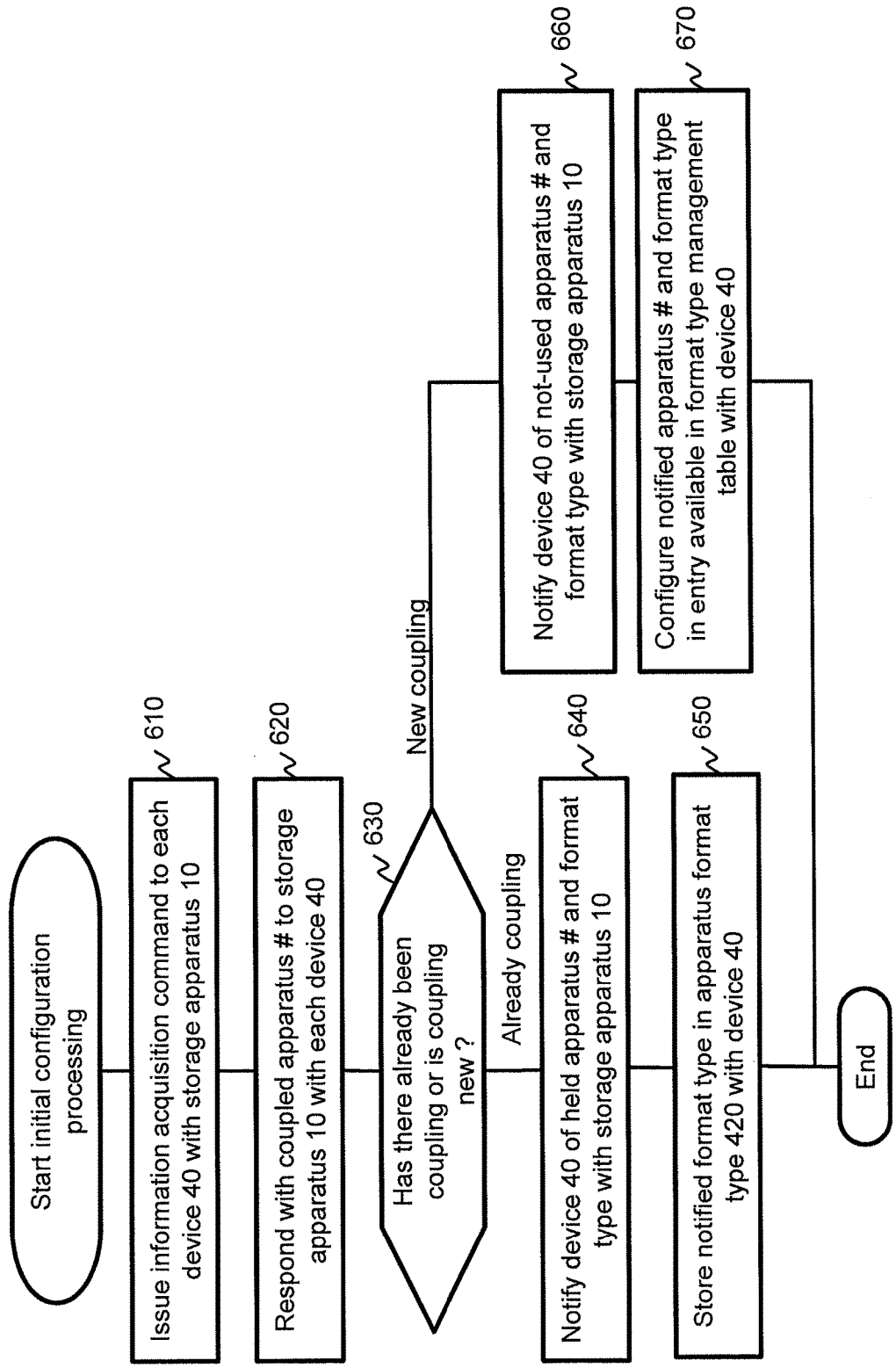
FIG. 9 is a flowchart of initial configuration processing according to Example 1.

FIG. 9 is a flowchart of the initial configuration processing according to Example 1.

When the power activation is performed, the storage apparatus 10 issues an information acquisition command (e.g., command such as Mode Sense as an SCSI command) for acquiring necessary information with respect to each device 40 (step 610).

The device 40 that has acquired the information acquisition command responds with an apparatus # of the storage apparatus 10 that is coupled in the current state as a response to the command (Step 620).

Next, the storage apparatus 10 determines whether there has already been coupling with the shared device unit 34 or coupling with the shared device unit 34 is new (step 630). Whether there has already been coupling with the shared device unit 34 or coupling with the shared device unit 34 is new can be determined from whether or not there is a hit upon searching the RAID group management table 150 by a device unit number of the shared device unit 34 and a drive number of the device 40. Specifically, in the case where the RAID group management table 150 is searched by the device unit number of the shared device unit 34 and the drive number of the device 40 and there has been a hit, it can be determined that there has already been coupling. In the case of a non-hit, it can be determined that coupling is new.

In the case where there has already been coupling with the shared device unit 34 as a result (step 630: already coupled), the storage apparatus 10 notifies the device 40 of an apparatus # of the drive notification apparatus # 152 in an entry that has been hit in step 630 and a format type (storage format type) of the storage apparatus 10 with an information configuration command (command such as Mode Select as an SCSI command) (step 640).

The device 40 searches the format type management table 400 for an entry corresponding to the notified apparatus #, and stores the notified storage format type in the apparatus format type 420 of the entry obtained by searching (step 650). Accordingly, the format type of the currently-coupled storage apparatus 10 is managed in the format type management table 400 of the device 40.

On the other hand, in the case where coupling with the shared device unit 34 is new (step 630: new coupling), the storage apparatus 10 checks the apparatus # acquired in step 620, and notifies the device 40 of an apparatus # not used in the device 40 and a format type of itself (step 660).

The device 40 searches the format type management table 400 for an entry corresponding to the notified apparatus #, confirms that the notified apparatus # is a number that is not used, and configures the notified apparatus # and apparatus format type in an available entry (step 670). Accordingly, the format type of the currently-coupled storage apparatus 10 is managed in the format type management table 400 of the device 40. It may be such that the storage apparatus 10 hands over information showing that coupling is new in step 660, and the device 40 does not perform a search of the format type management table 400 in order to confirm that the notified apparatus # is a number that is not used in step 670.

After the initial configuration processing described above, the storage apparatus 10 does not need to perform format conversion processing or the like for data of the device 40 to be used even if the storage apparatus 10 for which power has been activated is the migration-destination storage apparatus 10, and I/O processing can be executed with respect to the device 40 without waiting for termination of the format conversion processing. In the storage apparatus 10, an increase in processing load hardly occurs.

Next, processing (page format initial configuration processing) in which the page format type 556 of the logical-physical conversion table 550 is initially configured will be described. In an initial state, a page of a block is an available page not allocated with a logical address. Therefore, in an entry corresponding to each page in the logical-physical conversion table 550, the apparatus # 554, the logical address 555, and the page format type 556 for the entry are configured as an invalid value (Null) as in an entry for which the in-block page # 553 is "101" in the logical-physical conversion table 550 of FIG. 8.

Figure 10:
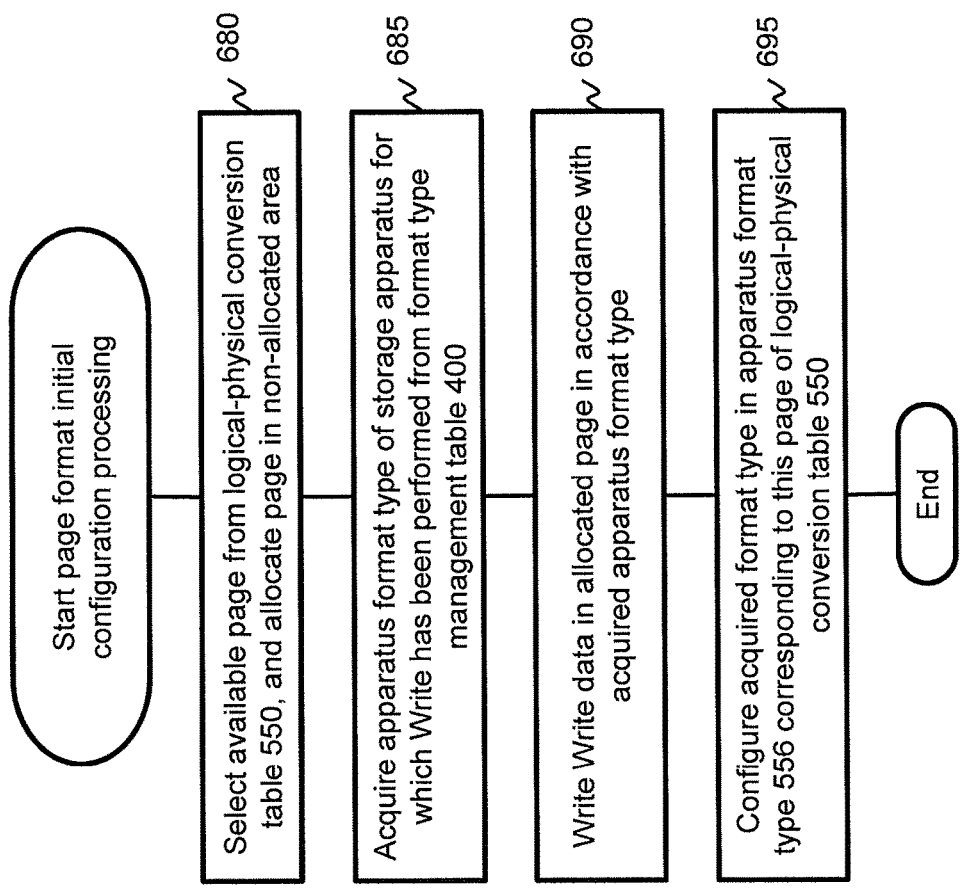
FIG. 10 is a flowchart of page format initial configuration processing according to Example 1.

FIG. 10 is a flowchart of the page format initial configuration processing according to Example 1.

The page format initial configuration processing is executed in the case where the device 40 has received a Write command with respect to a logical area (non-allocated area) to which a page is not allocated from the storage apparatus 10.

In the case where the Write command with respect to an area to which a page is not allocated has been received from the storage apparatus 10, the device 40 references the logical-physical conversion table 550, searches for one available page, and allocates a page to a non-allocated area by configuring an apparatus # of the storage apparatus 10 that is a transmission source of the Write command and a logical address of the non-allocated area in the Write command in the apparatus # 554 and the logical address 555 of an entry corresponding to the available page obtained by searching (step 680). Next, the device 40 acquires the apparatus format type 420 corresponding to the apparatus # of the storage apparatus 10 that is the transmission source of the Write command from the format type management table 400 (step 685).

Next, the device 40 writes data (Write data) that is a Write target received from the storage apparatus 10 in the allocated page in accordance with the format type acquired in step 685 (step 690). Then, after confirming that writing has been completed normally, the device 40 configures the format type acquired in step 685 in the apparatus format type 556 of the entry corresponding to the allocated page in the logical-physical conversion table 550 (step 695). With the processing described above, an initial value (value of initial format type) is configured in the page format type 556 of the entry corresponding to the newly allocated page.

Next, migration of a storage apparatus will be described.

Figure 11:
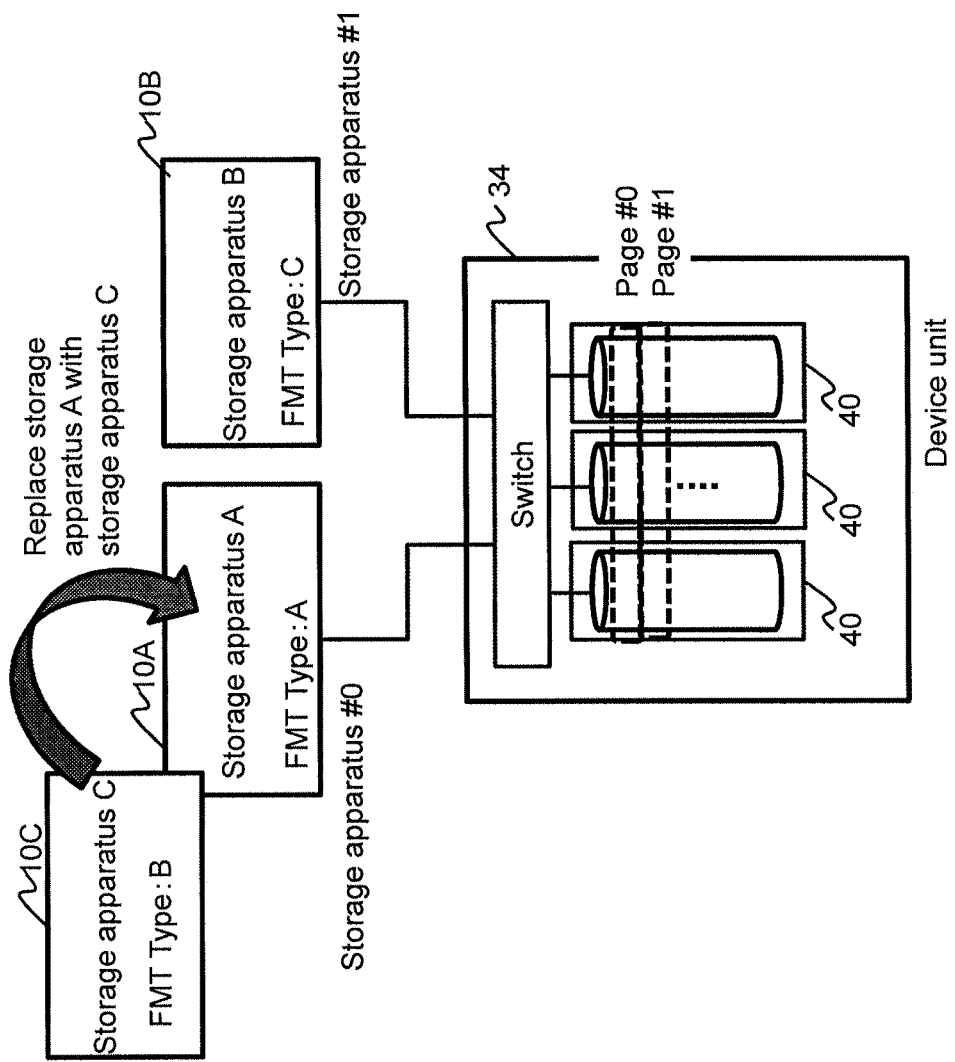
FIG. 11 is a diagram illustrating an overview of migration of a storage apparatus according to Example 1.

FIG. 11 is a diagram illustrating an overview of migration of a storage apparatus according to Example 1. FIG. 12 is a diagram showing the state of the format type management table after storage apparatus migration according to Example 1.

FIG. 11 shows an example of a case where migration of the storage apparatus 10 is from an old-type migration-source storage apparatus (storage apparatus A) to a new-type migration-destination storage apparatus (storage apparatus C).

As shown in FIG. 11, the storage apparatus A is to be replaced with the storage apparatus C for an apparatus #0 due to a reason such as a replacement of hardware. The format type (FMT) of the storage apparatus A is an A type, whereas the format type of the storage apparatus C is a B type, and the format types of these storage apparatuses differ.

Configuration information, apparatus #, or the like used in the storage apparatus A is passed over to the storage apparatus C with an existing method. For example, the LU management table 110 and the RAID group management table 150 stored in the storage apparatus A are stored in the storage apparatus C in a state where the content is unchanged.

Then, when power is activated for the storage apparatus C, the initial configuration processing shown in FIG. 9 is started. When the initial configuration processing of FIG. 9 is executed, the apparatus format type 420 in an entry of the apparatus #0 corresponding to the storage apparatus C in the format type management table 400 of the device 40 is changed from "A" that is the format type of the migration-source storage apparatus A to "B" that is the format type of the migration-destination storage apparatus C, as shown in FIG. 12.

In this manner, in the case where the storage apparatus 10 is replaced, the apparatus format type 420 of an entry corresponding to the migration-destination storage apparatus 10 in the format type management table 400 of the device 40 is then appropriately changed to the format type of the storage apparatus 10 after migration.

Next, reclamation processing in the device 40 will be described.

The reclamation processing is processing in which data is read regularly and rewritten in an available area in order to protect data from degradation due to the lapse of time in the device 40 including the FM chip as in a flash drive. Since degradation of the FM chip progresses in a physical area, it is often the case that the reclamation processing is implemented in block units.

Generally, it is often the case that a block as a target of reclamation is selected with the elapsed time or the like from the implementation of a previous write as the criterion. In the case where the elapsed time is the criterion in this manner, a block for which the elapsed time from a write is short is excluded from a target of the reclamation processing.

In contrast, as the criterion for selecting a block as a target of the reclamation processing, whether or not format conversion of data of the block is necessary is added besides the general criterion in this example. Accordingly, the reclamation processing is executed for a block that needs format conversion, even if the elapsed time from a previous write is short. Accordingly, data that needs format conversion can be format-converted at an early point. Whether or not format conversion is necessary can be determined from whether or not the page format type 556 of an entry corresponding to a page within a certain block in the logical-physical conversion table 550 and the apparatus format type 420 in the format type management table 400 corresponding to the apparatus # 554 of the entry match. That is, it can be determined that format conversion is not necessary in the case where the page format type 556 and the apparatus format type 420 match, and it can be determined that format conversion is necessary in the case where the page format type 556 and the apparatus format type 420 do not match. A block as a target of the reclamation processing may be selected with only a general criterion. Accordingly, with a block that needs reclamation as a target, format conversion is performed if the block needs format conversion. Therefore, since format conversion can be performed in parallel with the execution of reclamation, the format conversion can be achieved with relatively small processing load.

Figure 13:
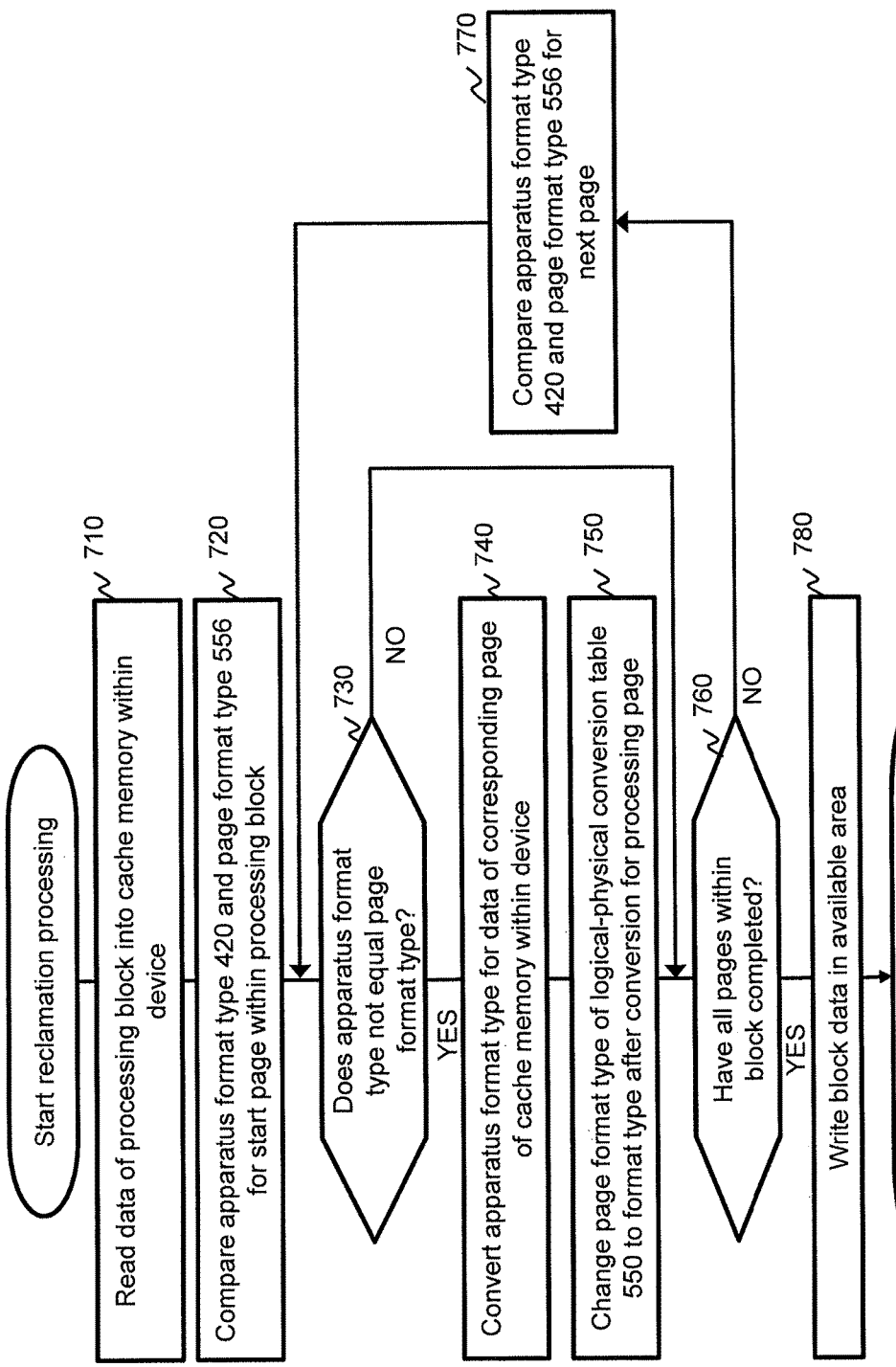
FIG. 13 is a flowchart of reclamation processing according to Example 1.

FIG. 13 is a flowchart of the reclamation processing according to Example 1.

The device 40 (specifically, CPU 43) reads data of a block (referred to as processing block in the description of FIG. 13) determined as a target for executing the reclamation processing into the CM 45 within the device 40 (step 710). Next, for a start page within the processing block, the device 40 compares the page format type 556 of an entry corresponding to the start page in the logical-physical conversion table 550 and the apparatus format type 420 in the format type management table 400 corresponding to the apparatus # 554 of the entry (step 720), and determines whether or not the page format type 556 and the page format type 420 differ (step 730).

In the case where the apparatus format type 420 and the page format type 556 differ as a result (step 730: YES), it can be determined that the format type of the storage apparatus 10 has been changed. Therefore, the device 40 converts data of the page (referred to as processing page) in the CM 45 to a format of the apparatus format type 420 (step 730). Next, the device 40 changes the page format type 556 of the entry in the logical-physical conversion table 550 for the processing page to the format type after conversion (step 750), and proceeds to step 760 of the processing.

On the other hand, in the case where the apparatus format type 420 and the page format type 556 do not differ (step 730: NO), it is not necessary to convert the format type. Therefore, the processing proceeds to step 760.

In step 760, the device 40 determines whether or not processing for all pages within the processing block as a target has been completed, proceeds to step 770 of the processing in the case where the processing for all pages as the target is not executed (step 760: NO), compares the page format type 556 of an entry in the logical-physical conversion table 550 for a next page in the processing block and the apparatus format type 420 in the format type management table 400 corresponding to the apparatus number 554 of the entry (step 770), and proceeds to step 730 of the processing.

On the other hand, in the case where the processing for all pages within the processing block as a target has been completed (step 760: YES), the device 40 writes data of the processing block that is present in the CM 45 in an available area (available block) of the FM chip 47, and associates a logical address of an entry corresponding to the processing block in the logical-physical conversion table 550 with respect to a block corresponding to the available area (step 780). Specifically, the device 40 stores, in the entry corresponding to the block of the available are to which the data is written, the apparatus # 554, the logical address 555, and the page format type 556 of the entry corresponding to the processing block in the logical-physical conversion table 550.

With the processing described above, reclamation can be executed with respect to one block. If there is another block that is a target of the reclamation processing, the device 40 executes processing similar to what is described above for the block as the target.

With the processing described above in the reclamation processing of which execution is necessary, the format is converted for data of a block that needs format conversion due to a replacement or the like of the storage apparatus 10. Therefore, the format of data can be converted effectively while preventing an increase in processing load of the storage apparatus 10 and the device 40.

Since a change in format can be acknowledged on the storage apparatus 10 side, a launch trigger and a target page of the reclamation processing for a format change may be given from the storage apparatus 10 side to the device 40 side. In this case, it is necessary to implement management or the like of the target page on the storage apparatus 10, a large amount of memory is necessary for management information thereof, and there is a possibility that the performance deteriorates due to an overhead for indication from the storage apparatus 10 to the device 40. In contrast, when a criterion on whether or not format conversion is necessary is added to a criterion for determining implementation of the reclamation processing as described above for determination by the device 40, management is not particularly necessary on the storage apparatus 10 side, and processing can be implemented by only the device 40 without newly adding management information. Since interaction between the storage apparatus 10 and the device 40 is also unnecessary, performance degradation of the storage apparatus 10 and the device 40 can also be prevented.

Next, device Read processing in the device 40 will be described.

Figure 14:
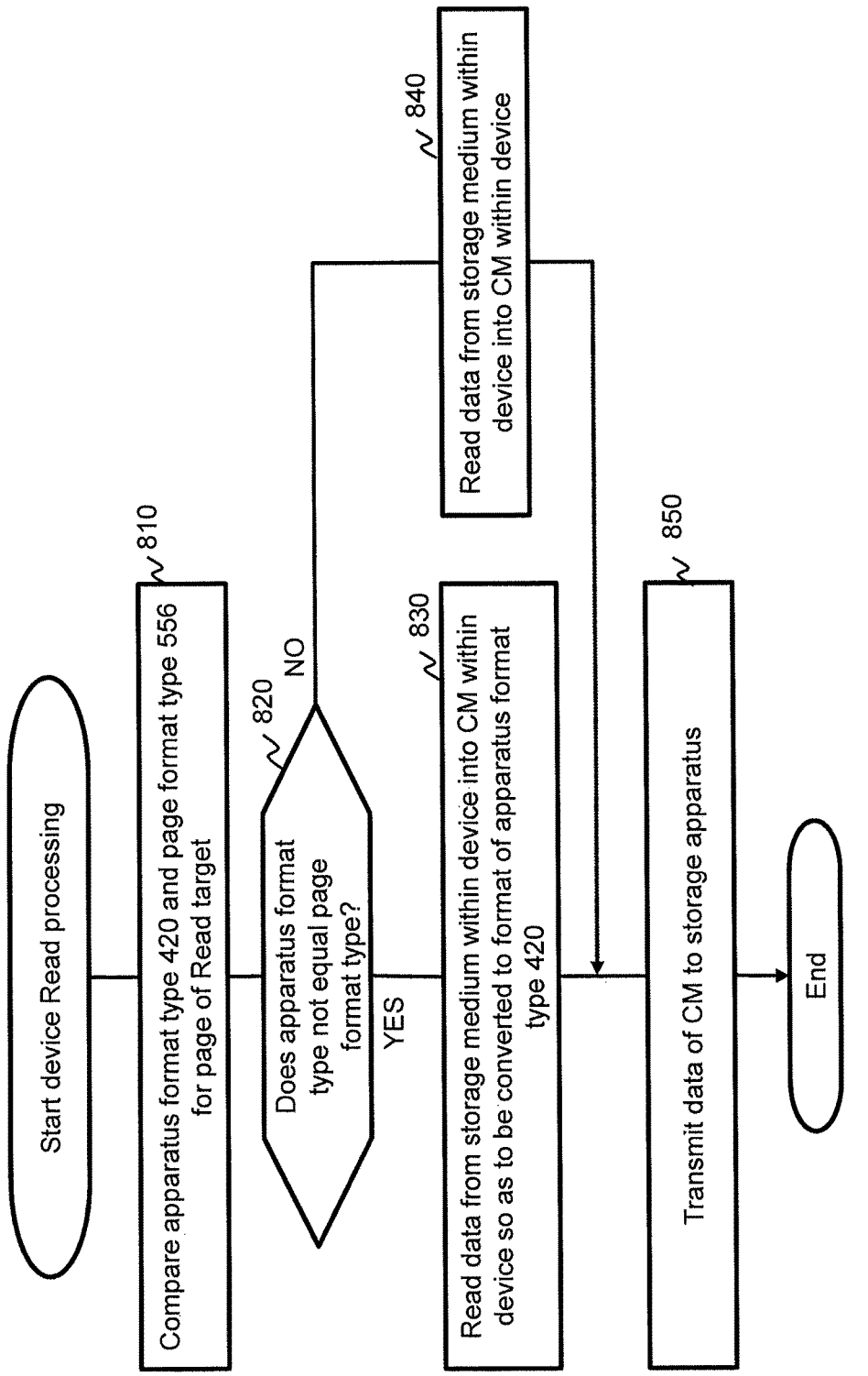
FIG. 14 is a flowchart of device Read processing according to Example 1.

FIG. 14 is a flowchart of the device Read processing according to Example 1.

The device Read processing is implemented in the case where the device 40 has received a Read command from the storage apparatus 10. The device Read processing includes a processing operation in the case where the Read command has been received in the case where format conversion by the reclamation processing described above is not implemented in the case where format conversion of data of the device 40 is necessary due to migration or the like of the storage apparatus 10.

Upon receiving the Read command form the storage apparatus 10, the device 40 compares, for a page (Read target page) storing data that is a target of the Read command, the page format type 556 of an entry corresponding to the Read target page in the logical-physical conversion table 550 and the apparatus format type 420 in the format type management table 400 corresponding to the apparatus # 554 of the entry (step 810), and determines whether or not the page format type 556 and the page format type 420 differ (step 820).

In the case where the apparatus format type 420 and the page format type 556 differ as a result (step 820: YES), it means that the format type of the storage apparatus 10 that is to utilize the data of the Read target page is changed and format conversion by the reclamation processing has not yet been performed. Therefore, the device 40 reads the data of the Read target page from the FM chip 47 into the CM 45, converts the read data to the format of the apparatus format type 420 (step 830), and proceeds to step 850 of the processing.

On the other hand, in the case where the apparatus format type 420 and the page format type 556 do not differ (step 820: NO), it means that the format of the data is the apparatus format type 420. Therefore, the device 40 reads the data of the Read target page from the FM chip 47 into the CM 45, and proceeds to step 850 of the processing.

In step 850, the device 40 responds with the data converted to the format of the apparatus format type 420 in step 830 or the data read in step 840 to the storage apparatus 10 (step 850).

With the device Read processing, the device 40 can respond with data of an appropriate format to the storage apparatus 10, even in the case where a Read command with respect to data that needs format conversion but is not yet format-converted has been received.

Next, device Write processing in the device 40 will be described.

Figure 15:
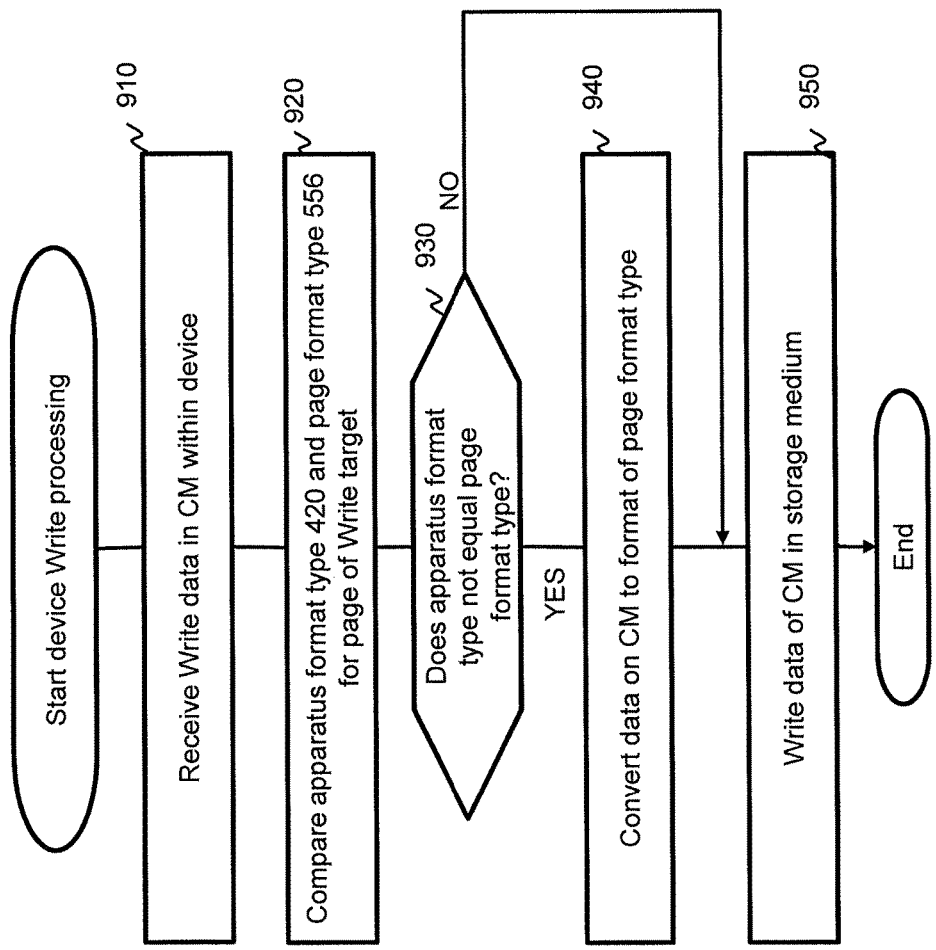
FIG. 15 is a flowchart of device Write processing according to Example 1.

FIG. 15 is a flowchart of the device Write processing according to Example 1.

The device Write processing is implemented in the case where the device 40 has received a Write command from the storage apparatus 10. The device Write processing includes a processing operation in the case where the Write command has been received in the case where format conversion by the reclamation processing described above is not implemented in the case where format conversion of data of the device 40 is necessary due to migration or the like of the storage apparatus 10.

Upon receiving the Write command from the storage apparatus 10, the device 40 (specifically, CPU 43) stores data that is a Write target of the Write command in the CM 45 (step 910). Next, for a page (Write target page) that is a storage destination for data as a target of the Write command, the device 40 compares the page format type 556 of an entry corresponding to the Write target page in the logical-physical conversion table 550 and the apparatus format type 420 in the format type management table 400 corresponding to the apparatus # 554 of the entry (step 920), and determines whether or not the page format type 556 and the page format type 420 differ (step 930)

In the case where the apparatus format type 420 and the page format type 556 differ, it means that the format type of the storage apparatus 10 that is to utilize the data of the Write target page is changed and format conversion by the reclamation processing has not yet been performed. Therefore, storing Write data as is in the format type after change of the storage apparatus 10 causes inconsistency. If the format of data stored in the page is changed, there is a possibility of an increase in size in some cases. There are cases where it is difficult to change the format of the data of the page for storage at this time point. Thus, in the case where the apparatus format type 420 and the page format type 556 differ (step 930: YES) in this example, the Write data in the CM 45 is converted to the format of the page format type 556 to provide consistency in format for the data on the page and the Write data (step 940), and the processing proceeds to step 950. The format conversion of the data of the page is executed in the reclamation processing.

On the other hand, in the case where the apparatus format type 420 and the page format type 556 do not differ (step 930: NO), it means that the format of the data of the page is the apparatus format type 420. Therefore, the processing proceeds to step 950.

In step 950, the device 40 writes the data of the CM 45 (data converted to the format of the page format type 420 in step 940 or data stored in step 910) in the FM chip 47.

With the device Write processing, the device 40 can store data in the FM chip 47 in a state where consistency is maintained, even in the case where a Write command with respect to data of a page that needs format conversion but is not yet format-converted has been received.

Although an example of a case where migration is from the storage apparatus 10 to another storage apparatus 10 has been described above, an effect similar to what is described above can be obtained by directly executing the configuration and the processing described above even in the case where a new storage apparatus 10 is added to a storage system, i.e., in the case of a new addition of a storage apparatus. That is, even the new addition of the storage apparatus 10, the storage apparatus 10 can perform I/O processing without waiting for termination of format conversion processing of data, and performance degradation hardly occurs.

Even in the case where the storage apparatus 10 to which a page is assigned is changed due to load balance between the storage apparatuses 10 and the storage format types of the storage apparatuses 10 before and after change differ, data can be managed without trouble by executing load balance processing below.

For load balance between the storage apparatuses 10 in the case where, for example, the load on each storage apparatus 10 is monitored and the load on one storage apparatus 10 is relatively heavy while the load on another storage apparatus 10 is relatively light, there are cases where an LU assigned to one storage apparatus 10 is assigned to another storage apparatus 10, cases where the storage apparatus 10 in which the load is relatively light makes a change such that an LU assigned to another storage apparatus 10 is assigned to itself, or the like.

Figure 16:
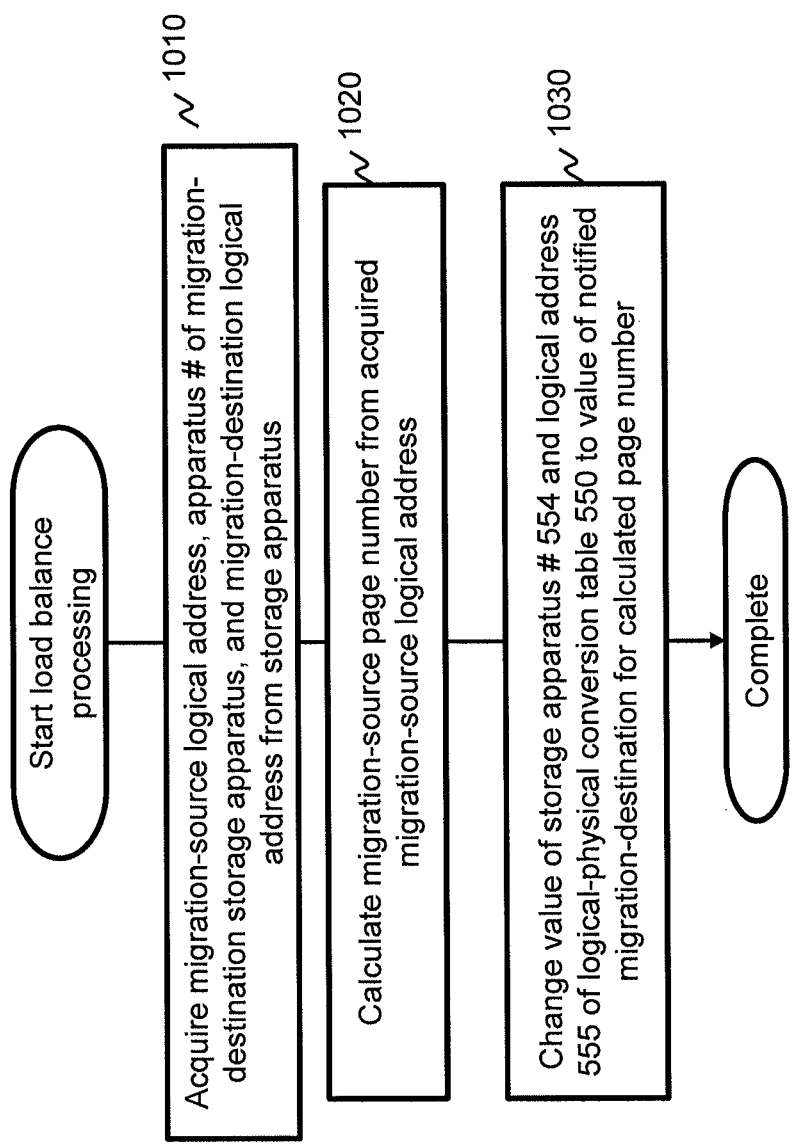
FIG. 16 is a flowchart of load balance processing according to Example 1.

FIG. 16 is a flowchart of the load balance processing according to Example 1.

The load balance processing is executed in the case where an indication of load balance has been received from the storage apparatus 10.

Upon acquiring a migration-source logical address, an apparatus # of the migration-destination storage apparatus 10, and a migration-destination logical address as the indication of the load balance from the storage apparatus 10 (step 1010), the device 40 calculates a migration-source page number based on the acquired migration-source logical address (step 1020). Next, the device 40 changes the apparatus # 554 and the logical address 555 of an entry in the logical-physical conversion table 550 corresponding to the calculated page number to the apparatus # of the migration-destination storage apparatus and the migration-destination logical address notified from the storage apparatus 10 (step 1030). The indication of the load balance notified by the storage apparatus 10 to the device 40 may include a plurality of sets of a migration-source logical address, an apparatus # of a migration-destination storage apparatus, and a migration-destination logical address. In this case, processing of step 1020 and step 1030 is executed with each set as a target.

When the load balance processing is executed, format conversion for data of a page that is a target of the load balance or I/O processing with respect to the data of the page can be performed appropriately by execution of the processing (the reclamation processing, the device Read processing, or the device Write processing) on the device 40 side described above. The storage apparatus 10 can perform I/O processing without waiting for termination of format conversion processing of data, and performance degradation hardly occurs.

EXAMPLE 2

Next, the details of a storage system according to Example 2 will be described below.

A storage system according to Example 2 is a storage system shown in FIG. 1, the storage system being such that a device (first storage device) having a function (format conversion function) of executing the reclamation processing, the device Read processing, and the device Write processing according to Example 1 and a device (second storage device: e.g., a general HDD) not having the format conversion function coexist as the device 40.

The storage apparatus 10 according to Example 2 is configured to execute storage Read processing and storage Write processing below that are new.

Figure 17:
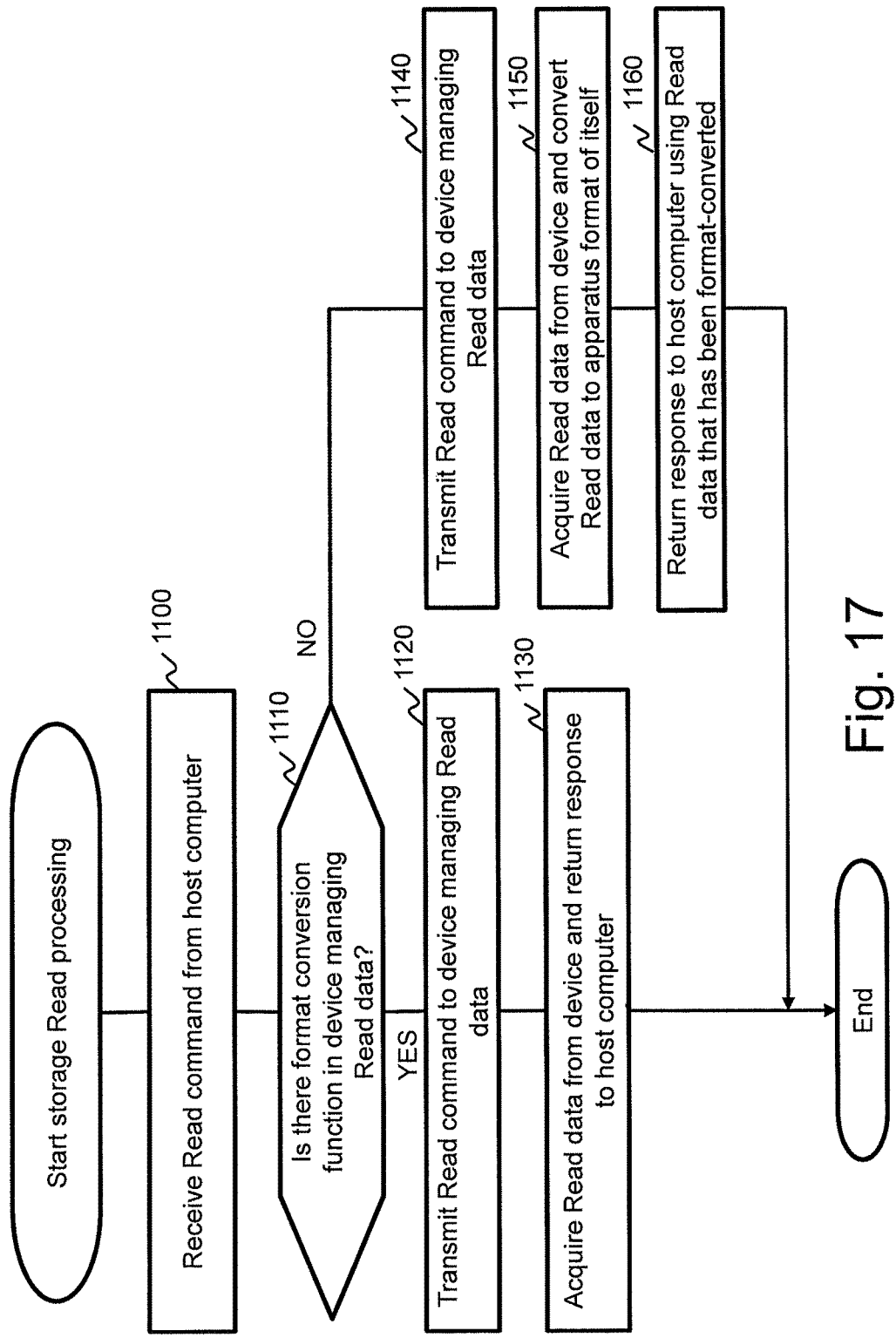
FIG. 17 is a flowchart of storage Read processing according to Example 2.

FIG. 17 is a flowchart of the storage Read processing according to Example 2.

The storage Read processing is processing executed in the case where the storage apparatus 10 has received a Read command from the host computer 50.

Upon receiving the Read command from the host computer 50 (step 1100), the storage apparatus 10 determines from the Read command whether or not there is the format conversion function in the device 40 managing target data (Read data) (step 1110). Whether or not there is the format conversion function in the device 40 managing the Read data can be acknowledged by referencing the LU management table 110 and the RAID group management table 150 based on the LUN and the logical address included in the Read command to identify an entry corresponding to the device 40 managing the Read data in the RAID group management table 150 and referencing the conversion function presence 157 of the entry.

In the case where there is the format conversion function in the device 40 managing the Read data as a result (step 1110: YES), the storage apparatus 10 transmits the Read command to the device 40 managing the Read data (step 1120). The device 40 that has received the Read command executes the device Read processing shown in FIG. 14, and returns the Read data in the format type of the storage apparatus 10 as a response to the storage apparatus 10.

The storage apparatus 10 acquires the Read data returned from the device 40, returns the acquired Read data to the host computer 50 as a response (step 1130), and terminates the storage Read processing.

On the other hand, in the case where the format conversion function is not in the device 40 managing the Read data (step 1110: NO), the storage apparatus 10 transmits the Read command to the device 40 managing the Read data (step 1140). The device 40 that has received the Read command executes general Read processing, and returns the Read data unchanged in the format type stored in the device 40 as a response to the storage apparatus 10.

Next, the storage apparatus 10 acquires the Read data returned from the device 40, and converts the Read data to a format of the format type of the storage apparatus 10 (1150) in the case where the format type of the device 40 differs from the format type of the storage apparatus 10.

Next, the storage apparatus 10 returns the Read data to the host computer 50 as a response (1160), and terminates the storage Read processing.

With the storage Read processing, data in the format of a device without the format conversion function can be appropriately converted to and acquired in the format of the storage apparatus 10.

Figure 18:
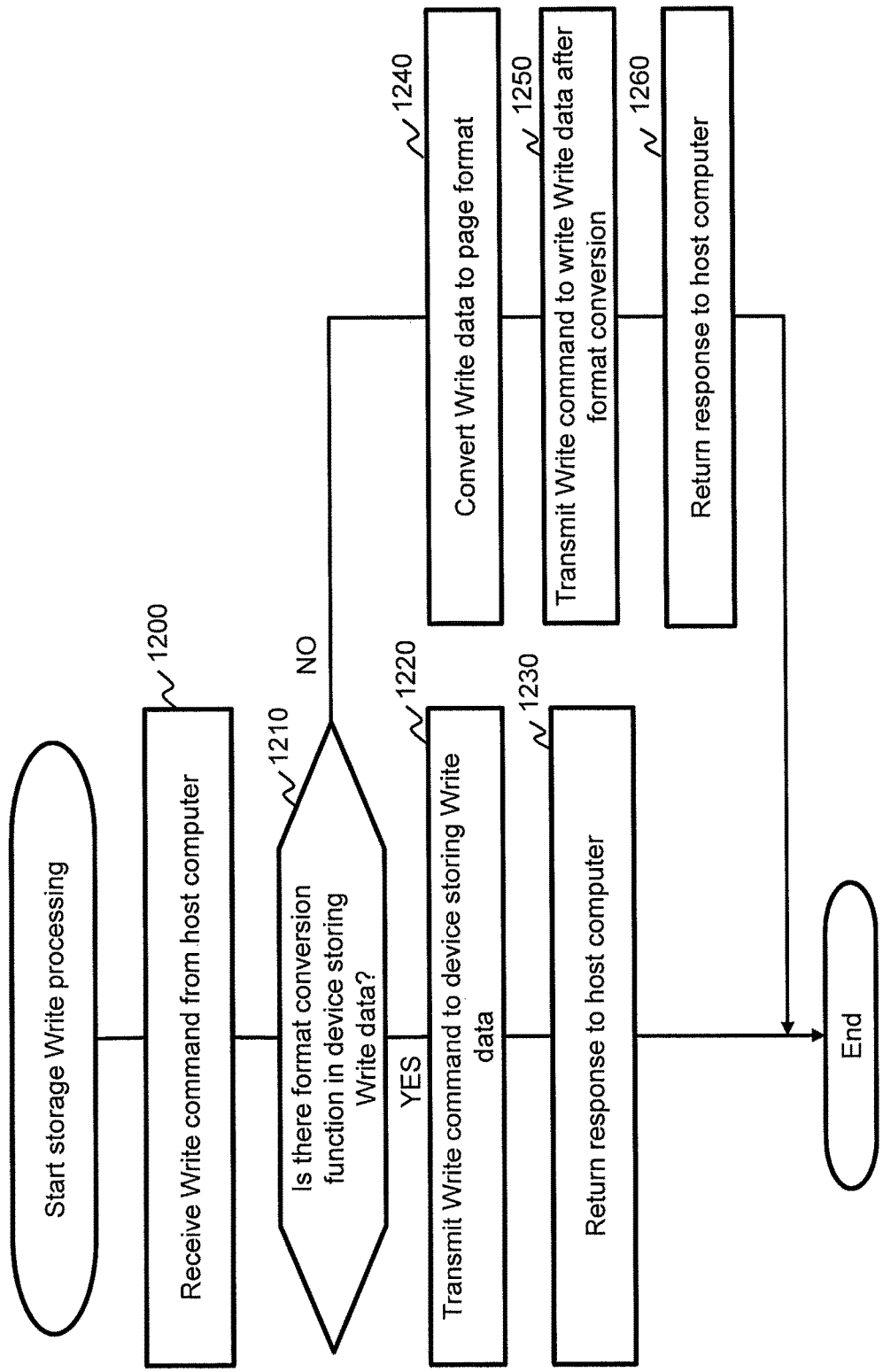
FIG. 18 is a flowchart of storage Write processing according to Example 2.

FIG. 18 is a flowchart of the storage Write processing according to Example 2.

The storage Write processing is processing executed in the case where the storage apparatus 10 has received a Write command from the host computer 50.

Upon receiving the Write command from the host computer 50 (step 1200), the storage apparatus 10 determines from the Write command whether or not there is the format conversion function in the device 40 managing target data (Write data) (step 1210). Whether or not there is the format conversion function in the device 40 managing the Write data can be acknowledged by referencing the LU management table 110 and the RAID group management table 150 based on the LUN and the logical address included in the Write command to identify an entry corresponding to the device 40 managing the Write data in the RAID group management table 150 and referencing the conversion function presence 157 of the entry.

In the case where there is the format conversion function in the device 40 managing the Write data as a result (step 1210: YES), the storage apparatus 10 transmits the Write command to the device 40 managing the Write data (step 1220). The device 40 that has received the Write command executes the device Write processing shown in FIG. 15, and returns a response to the storage apparatus 10.

Upon receiving a response Write returned from the device 40, the storage apparatus 10 returns a response to the host computer 50 (step 1230), and terminates the storage Write processing.

On the other hand, in the case where the format conversion function is not in the device 40 managing the Write data (step 1210: NO), the storage apparatus 10 converts the Write data to a format of the format type of the storage apparatus 10 (step 1240) in the case where the format type of the device 40 differs from the format type of the storage apparatus 10.

The storage apparatus 10 transmits the Write command together with the Write data to the device 40 managing the Write data (step 1250). At this time, the storage apparatus 10 transmits the Write data after conversion to the device 40 in the case where the format of the Write data has been converted in step 1240. The device 40 that has received the Write command executes general Write processing, stores the Write data in the device 40, and returns a response to the storage apparatus 10.

Next, upon receiving the response from the device 40, the storage apparatus 10 returns a response with respect to the Write command to the host computer 50 (step 1260), and terminates the storage Write processing.

With the storage Write processing with respect to a device without the format conversion function, the Write data can be converted to and appropriately stored in the format of the device.

Some examples have been described above. However, the present invention is not limited those examples.

REFERENCE SIGNS LIST 10A, 10B, 10C Storage apparatus
34 Shared device unit
40 Device

The invention claimed is:

1. A storage system comprising:
a storage apparatus; and
a storage device that is a basis for a storage area provided to the storage apparatus,
the storage device being configured to determine whether or not a first format that is a format of data stored in the storage device and a second format that is a format of data utilized by the storage apparatus managing the data match with each other and perform format conversion of either converting data in the first format to data in the second format or converting data in the second format to data in the first format in a case where the first format and the second format do not match with each other,
wherein the storage device is a storage device configured to perform writing of data in a predetermined page unit and perform erasure of data in a unit of a block forming a plurality of pages, and
wherein the storage device is configured to perform, upon execution of reclamation in which data of a page within a predetermined block of the storage device is moved to another block, the determination with respect to data to be moved in the reclamation.

2. The storage system according to claim 1,
wherein the storage device is configured to, in a case where a read request has been received from the storage apparatus, perform the determination for data that is a target of the read request, and transmit data in the second format obtained by the format conversion to the storage apparatus.

3. The storage system according to claim 1,
wherein the storage device is configured to, in a case where a write request has been received from the storage apparatus, perform the determination for data that is a target of the write request, and store data in the first format obtained by the format conversion.

4. The storage system according to claim 1,
wherein the storage device is configured to receive, from a storage apparatus after replacement in which the data is managed, information for identifying a second format utilized by the storage apparatus, and
wherein the determination is a determination on whether or not a second format corresponding to the received information and a first format of the data match with each other.

5. The storage system according to claim 1,
wherein the storage device is configured to receive, from a storage apparatus after change in which the data is to be managed due to load balance, information for identifying a second format utilized by the storage apparatus, and
wherein the determination is a determination on whether or not a second format corresponding to the received information and a first format of the data match with each other.

6. The storage system according to claim 1, further comprising, aside from a first storage device that is the storage device, a second storage device that is not capable of executing the determination and the format conversion,
wherein, in a case of an access with respect to the first storage device, the storage apparatus is configured to not execute the determination for data that is a target of the access while the first storage device is configured to perform the determination for the data that is a target of the access, and
wherein, in a case of an access with respect to the second storage device, the storage apparatus is configured to execute the determination for data that is a target of the access.

7. The storage system according to claim 1,
wherein the storage device is configured to store information for identifying the first format and information for identifying the second format.

8. The storage system according to claim 1,
wherein the storage apparatus is configured to transmit information for identifying the second format, to the storage device at a time of start-up of the storage apparatus.

9. A data management method comprising:
determining, by a storage device that is a basis for a storage area provided to a storage apparatus, whether or not a first format that is a format of data stored in the storage device and a second format that is a format of data utilized by the storage apparatus managing the data match with each other; and
performing, by the storage device, format conversion of either converting data in the first format to data in the second format or converting data in the second format to data in the first format in a case where the first format and the second format do not match with each other,
wherein the storage device is a storage device configured to perform writing of data in a predetermined page unit and perform erasure of data in a unit of a block forming a plurality of pages, and
performing, the storage device, upon execution of reclamation in which data of a page within a predetermined block of the storage device is moved to another block, the determination with respect to data to be moved in the reclamation.

10. The data management method according to claim 9,
in a case where a read request has been received from the storage apparatus, performing, by the storage device, the determination for data that is a target of the read request, and transmitting, by the storage device, data in the second format obtained by the format conversion to the storage apparatus.

11. The data management method according to claim 9,
in a case where a write request has been received from the storage apparatus, performing, by the storage device, the determination for data that is a target of the write request, and storing, by the storage device, data in the first format obtained by the format conversion.

12. The data management method according to claim 9,
receiving, by the storage device, from a storage apparatus after replacement in which the data is managed, information for identifying a second format utilized by the storage apparatus, and
wherein the determination is a determination on whether or not a second format corresponding to the received information and a first format of the data match with each other.

13. The data management method according to claim 9,
receiving, by the storage system, from a storage apparatus after change in which the data is to be managed due to load balance, information for identifying a second format utilized by the storage apparatus, and
wherein the determination is a determination on whether or not a second format corresponding to the received information and a first format of the data match with each other.

* * * * *